L. RENAULT.
AXLE FOR MOTOR ROAD VEHICLES.
APPLICATION FILED DEC. 12, 1906.

916,888.

Patented Mar. 30, 1909.
5 SHEETS—SHEET 4.

Witnesses:

Inventor
Louis Renault
By
James L. Norris
Atty.

L. RENAULT.
AXLE FOR MOTOR ROAD VEHICLES.
APPLICATION FILED DEC. 12, 1906.
916,888.
Patented Mar. 30, 1909.
5 SHEETS—SHEET 5.
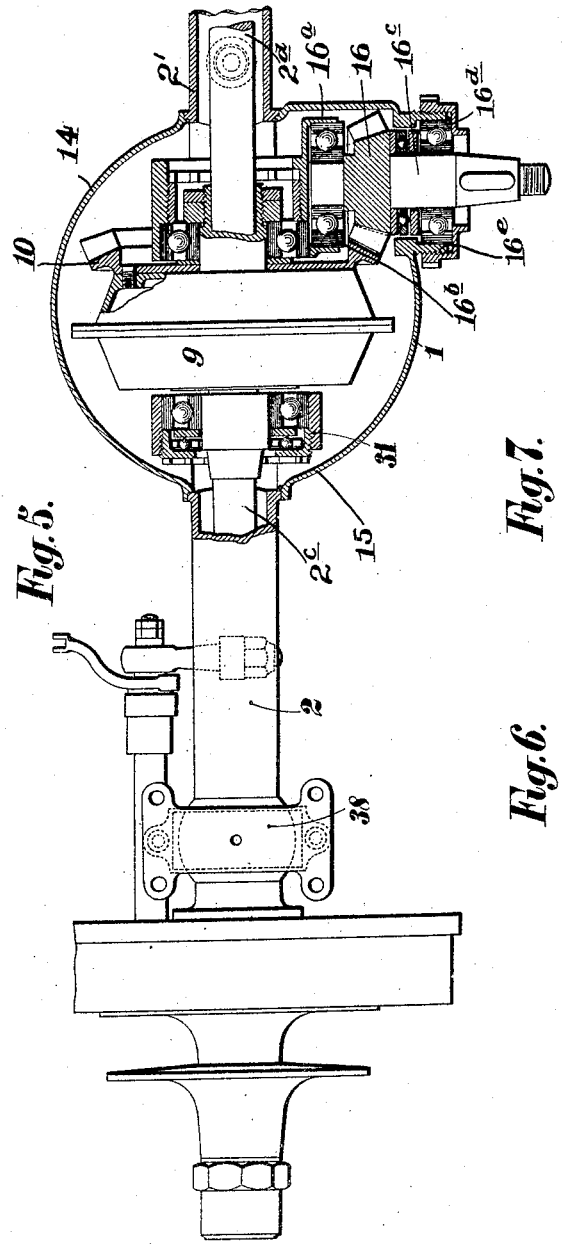
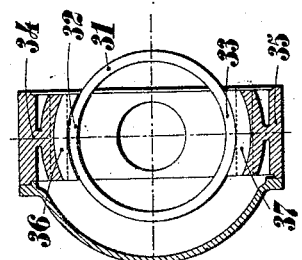
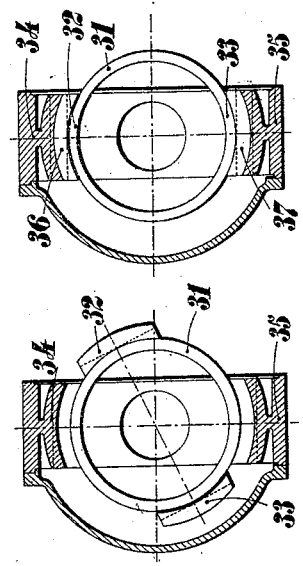
Witnesses:
Inventor
Louis Renault
By
James L. Norris
Atty.

UNITED STATES PATENT OFFICE.

LOUIS RENAULT, OF BILLANCOURT, FRANCE.

AXLE FOR MOTOR ROAD-VEHICLES.

No. 916,888.          Specification of Letters Patent.        Patented March 30, 1909.

Application filed December 12, 1906. Serial No. 347,505.

*To all whom it may concern:*

Be it known that I, LOUIS RENAULT, engineer, citizen of the French Republic, residing at Billancourt, Department of Seine, France, and whose post-office address is 139 Rue du Point du Jour, in the said city, have invented certain new and useful Improvements in Axles for Motor Road-Vehicles, of which the following is a specification.

This invention relates to motor vehicles, and has for its object to provide means in a manner as hereinafter set forth constituting a counter-axle for the vehicle and which is adapted to support the driven axle, the differential gearing, the brake mechanism, the spring supports, and further so constructed as to enable the connection thereto of means to prevent the turning thereof, and by the foregoing arrangement the various elements of the vehicle referred to are supported by a single element.

Figure 1:
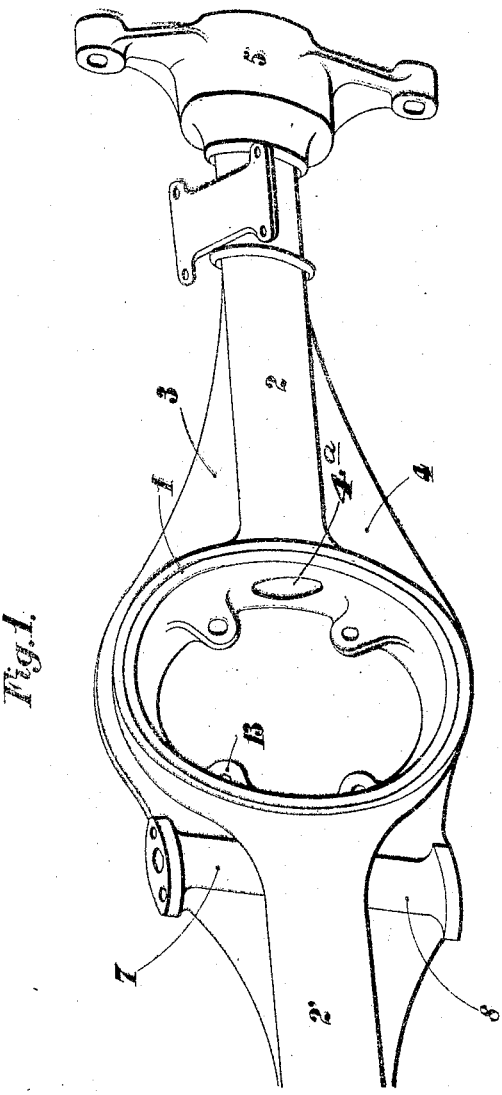
Figure 2:
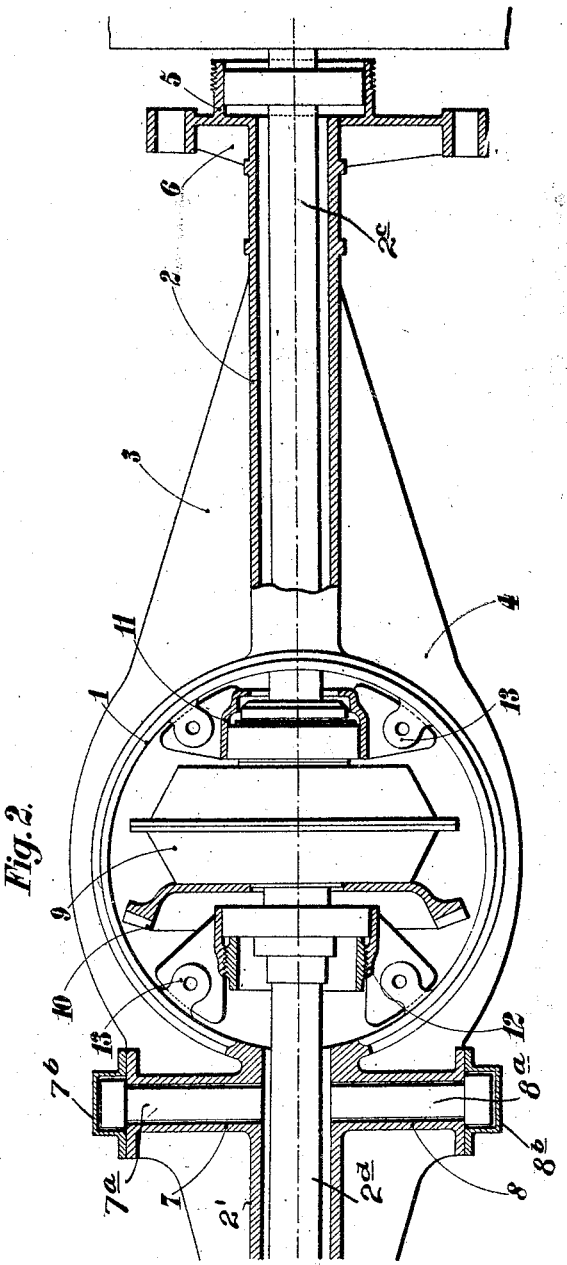
Figure 3:
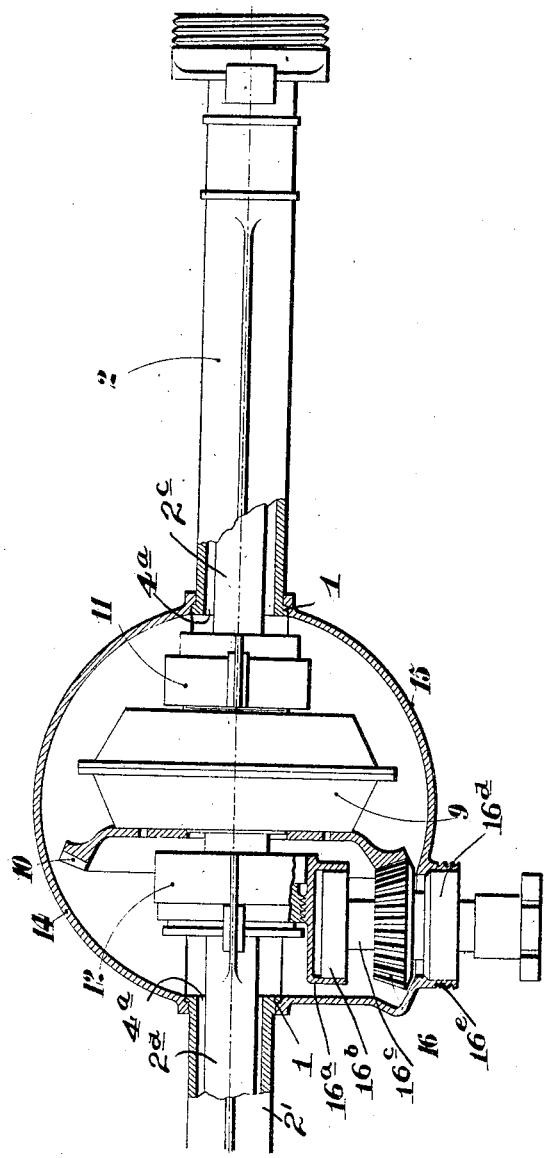
Figure 4:
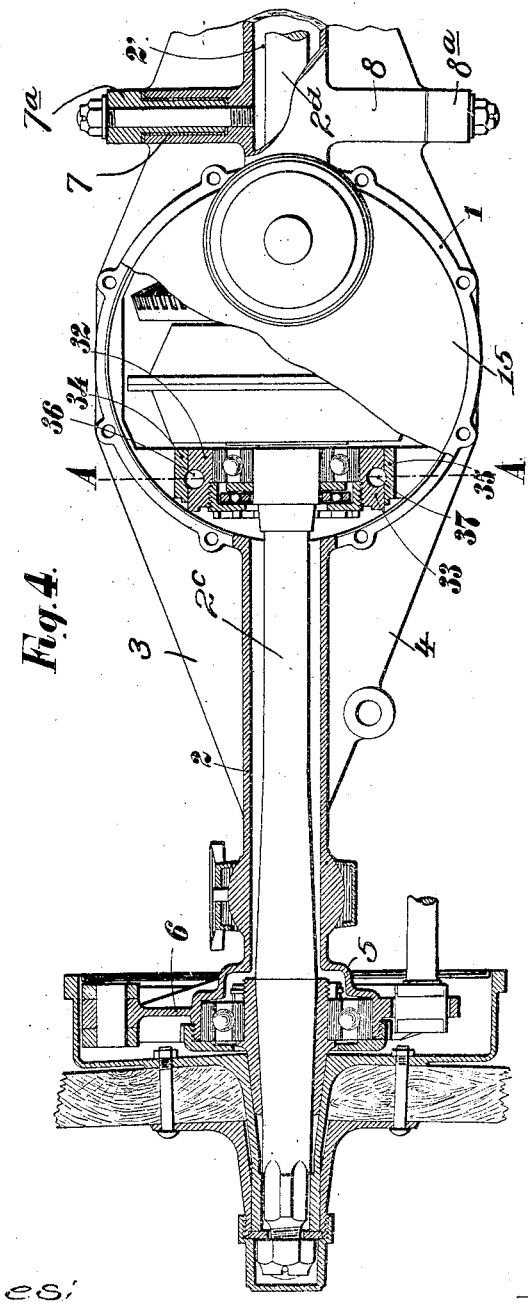

In the drawings, wherein like reference characters denote corresponding parts throughout the several views—Figure 1 is a perspective view of a counter-axle in accordance with this invention; Fig. 2 is a vertical sectional view of the counter-axle, also showing certain of the elements supported thereby; Fig. 3 is a sectional plan: Fig. 4 is a sectional elevation of a modification; Fig. 5 is a sectional plan of the construction shown in Fig. 4; Figs. 6 and 7 are transverse sections on line $a$—$a$ of Fig. 4, showing the support of the differential gearing.

Referring to the drawings in detail, 1 denotes an annular member having on each side, approximately centrally, a laterally-extending tubular member. These members are indicated by the reference characters 2, 2' and are reinforced through the medium of the upper ribs 3 and the lower ribs 4, these ribs being formed integral with the tubular members and with the annular member 1. The annular member 1 is formed with a pair of diametrically opposite openings $4^a$ which communicate with the tubular members 2, 2'. The outer end of each of the tubular members has formed integral therewith a box 5 and is further provided with supports 6 for the wheel brake. One of the ribs 3, as well as one of the ribs 4, is provided with a hollow boss. These hollow bosses are indicated by the reference characters 7, 8 and are arranged in vertical alinement. The function of the bosses 7, 8 is to receive the ends $7^a$ and $8^a$ of a fork the fork as an entirety not being shown which is adapted to be secured to the frame of the vehicle and to prevent the shifting of the counter-axle. Caps $7^b$ and $8^b$ of suitable form are secured to the outer ends of the bosses, one advantageous form being shown in Fig. 2, and another advantageous form being shown in Fig. 4.

The inner face of the annular member 1 is provided with a plurality of inwardly-extending apertured lugs 13 to which are connected the supports 11, 12 of the bearings of the differential gearing. The casing of the differential gearing is indicated by the reference character 9 and the crown by the reference character 10. These elements are arranged within the annular member 1. The sections of the driven axle are indicated by the reference characters $2^c$ and $2^d$. Said sections extend through the tubular respective members 2, 2' and are connected with the differential gear in a known manner.

The inclosing means for the elements which are positioned within the annular member 1 is formed of two sections 14 and 15 which are fixed to the said member 1. The said means not only completely incloses the differential gearing, but also prevents the entrance of any foreign bodies which would have an injurious effect upon the differential gearing. The said means further prevents the entrance of foreign bodies to the tubular members 2, 2' so that the axle sections will not be injured. The section 14 serves only as a cover, while the section 15 in addition to performing its function to inclose a portion of the differential gearing, also carries the bearing of the pinion 16 which meshes with the crown gear 10 of the differential gearing. The pinion 16 is driven from the motor through the medium of an intermediary of the change speed gear. A support $16^a$ connected with the support 12 is provided, the said support $16^a$ being for the bearing $16^b$ at that end of the shaft $16^c$ which projects into the inclosing means. The shaft $16^c$ carries the pinion 16. The outer bearing for the shaft 16 is indicated by the reference character $16^d$ and engages a flange $16^e$ which projects from the section 15.

The supports for the differential gearing may be modified in such a manner as to dispense with the lugs 13 and in this connection the modified form of supporting differential gearing is shown in Figs. 4, 5, 6 and 7. By reference to Figs. 4, 5, 6 and 7, 31 denotes a cylindrical box which carries the fixed cup of a ball bearing and is provided with two diametrically opposite tenons 32, 33, which are adapted to be positioned between the curved pieces 34, 35 formed integral with the annular member 1 and projecting from the inner face thereof. The outer face of each of the tenons is cylindrical and conforms to the shape of the inner face of the pieces 34, 35. When mounting the box 31 in position it is entered as shown in Fig. 6, then shifted on its axis until the tenons 32, 33 come between the pieces 34, 35, as shown in Fig. 7. For rigidly securing the box 31 and consequently centering the same, bolts are introduced into the openings 36, 37, which are formed in the tenons 32, 33 and pieces 34 and 35. The casing of the ball bearing is then centered.

By setting up the inclosing means in a manner as stated—that is to say formed of two sections which are detachably secured to the annular member 1—it allows access to be had to the differential gearing when occasion so requires.

What I claim is—

1. In motor vehicles, a counter-axle formed of a single element and embodying a centrally-disposed annular member having projecting laterally from each side thereof a hollow tubular member, said annular member provided with diametrically opposite openings communicating with the tubular members, and ribs formed integral with said members, said element being provided with means whereby it can be fixed against movement.

2. In motor vehicles, a counter-axle formed of a single element and embodying a centrally-disposed annular member having projecting laterally from each side thereof a hollow tubular member, said annular member provided with diametrically opposite openings communicating with the tubular members, ribs formed integral with said members and said element provided with means whereby it can be fixed from movement, combined with means carried by the annular member for supporting a differential gearing within the said annular member, and a sectional inclosing means for said differential gearing, one of the sections of said means carrying a part of the driving means for the differential gearing and the other of said sections detachable to permit of access being had to the differential gearing.

In testimony whereof I have hereunto set my hand in presence of two subscribing witnesses.

LOUIS RENAULT.

Witnesses:
EMILE KLOTZ,
MEADE RIDAUD.